United States Patent [19]

Gupta et al.

[11] Patent Number: 5,845,245

[45] Date of Patent: Dec. 1, 1998

[54] METHOD AND APPARATUS FOR REDUCING FALSE REJECTION IN A SPEECH RECOGNITION SYSTEM

[75] Inventors: Vishwa Gupta, Brossard; Serge Robillard, Lachine, both of Canada

[73] Assignee: Northern Telecom Limited, Montreal, Canada

[21] Appl. No.: 753,605

[22] Filed: Nov. 27, 1996

[51] Int. Cl.[6] .................................. G10L 5/06; G10L 9/00
[52] U.S. Cl. ............................................. 704/231; 704/240
[58] Field of Search ..................................... 704/231, 236, 704/238–240, 246, 250, 251; 379/67, 88, 89

[56] References Cited

PUBLICATIONS

Lennig, "Putting Speech Recognition to Work in the Telephone Network", Computer, IEEE, Bell–Northern Research and INRS–Telecommunications, (1990).

Gorin et al., "Adaptive Acquisition of Language", Computer Speech and Language, vol. 5, (1991), pp. 101–132.

Lennig et al., "Flexible Vocabulary Recognition of Speech Over the Telephone", *Bell –Northern Research and INRS–Telecommunications*, pp. 1–3, (1992).

Lennig et al., "Automated Bilingual Directory Assistance Trial in Bell Canada", *Bell–Northern Research*, pp. 1–4.

Y. Gao et al., "Dynamic Adaptation of Hidden Markov Model for Robust Speech Recognition", IEEE International Syposium on Circuits and Systems, vol. 2, May (1989), pp. 1336–1339.

*Primary Examiner*—David R. Hudspeth
*Assistant Examiner*—Patrick N. Edouard

[57] ABSTRACT

The invention relates to a method and apparatus for grouping orthographies in a speech recognition dictionary to reduce false rejection. In a typical speech recognition system, the process of speech recognition consists of scanning the vocabulary database by using a fast match algorithm to find the top N orthography groups. In a second pass the orthographies in the selected groups are re-scored using more precise likelihoods. The top orthographies in the top two groups are then processed by a rejection algorithm to find if they are sufficiently distinct from one another. In the affirmative the top choice candidate is accepted, otherwise the entire procedure is terminated. The novel method comprises the steps of grouping confusable orthographies together to reduce the possibility of false rejection.

44 Claims, 7 Drawing Sheets

METHOD AND APPARATUS FOR REDUCING FALSE REJECTION IN A SPEECH RECOGNITION SYSTEM

FIELD OF THE INVENTION

This invention relates to a method and an apparatus for automatically performing desired actions in response to spoken requests. It is applicable to speech recognition systems, more particularly methods and apparatuses for automatically providing desired information in response to spoken requests, as may be used to automate telephone directory assistance functions partially or fully.

BACKGROUND OF THE INVENTION

Besides providing printed telephone directories, telephone companies provide telephone directory assistance services. Users of these services call predetermined telephone numbers and are connected to directory assistance operators. The operators access directory databases to locate the directory listings requested by the users, and release the telephone numbers of those listings to the users.

Because telephone companies handle a very large number of directory assistance calls per year, the associated labor costs are very significant. Consequently, telephone companies and telephone equipment manufacturers have devoted considerable effort to the development of systems that reduce the labor costs associated with providing directory assistance services.

In a typical directory assistance system the caller is first prompted to provide listing information, in other words to specify in what area resides the business or individual whose telephone number he seeks. If valid speech is detected, the speech recognition layer is invoked in an attempt to recognize the unknown utterance. On a first pass search, a fast match algorithm is used to select the top N orthography groups. In a second pass the individual orthographies from the selected groups are re-scored using a more precise likelihoods. The top orthography in each of the top two groups are then processed by a rejection algorithm that evaluates if they are sufficiently distinctive from one another so the top choice candidate can be considered a valid recognition. Usually, three parameters are used by the rejection algorithm: the likelihood per frame of the top choice candidate, the duration likelihood of the phonemes in this top choice, and the likelihood ratio of the two candidates. The last measure requires that the two orthographies the phonetically far apart. If these orthographies are phonetically close they will be rejected frequently.

Consider the following example. The first pass search using the fast match algorithm selects two candidate groups, namely group A and Group B. The following table shows the individual orthographies in the groups.

| GROUP A | GROUP B |
| --- | --- |
| Ville de Laval | Ville Lassalle |
| Laval | Lassalle |

The individual entries in each of the selected groups are re-scored in a second-pass search. The order of the entries in groups A and B is now as follows.

| GROUP A | GROUP B |
| --- | --- |
| Laval | Lassalle |
| Ville de Laval | Ville Lassalle |

The orthographies <<Laval>> and <<Lassalle>> are the top choices in the respective groups. For the purpose of this example let us assume that <<Laval>> has a higher score than <<Lassalle>>. The two orthographies are now processed by the rejection algorithm that will determine, among other things, how far phonetically these top choice candidates are. In this example the orthographies are phonetically very similar to one another. The output of the rejection algorithm processing suggests that a correct resolution between the orthographies is unlikely. In other words, there is a real possibility that an incorrect choice will be made.

As seen in the above example, the rejection process can often refuse acceptance of words that have been correctly identified by the speech recognition layer, solely on the basis of the existence of confusable words in the dictionary. This may lead to a problem where some entries will always be rejected. For example, every time a caller requests "Laval" the rejection process will not authorize the acceptance simply because "Lassalle" exists in the dictionary and the rejection ratio will always be too low. Thus, some entries will always be the subject of a self-collision problem so that they will be automated less frequently.

Thus, there exists a need in the industry to refine the rejection process to avoid phonetically similar entries to be consistently rejected although the speech recognition layer has effected the correct choice.

BRIEF SUMMARY OF THE INVENTION

An object of the present invention is to provide a speech recognition dictionary configured to reduce the likelihood of false rejection.

Another object of the invention is to provide a speech recognition system where the likelihood of false rejection is reduced.

Another object the present invention is to provide a method for grouping entries in a speech recognition dictionary to reduce the likelihood of false rejection.

A further object of the invention is a computer readable medium containing a program element that instructs a computer to process a speech recognition dictionary to re-arrange the entries therein in order to reduce the likelihood of false rejection.

The present inventors have made the unexpected discovery that false rejection in a speech recognition system can be significantly reduced by grouping confusable orthographies in the same group of the speech recognition dictionary. During the speech recognition process those groups are examined by the fast match algorithm to generate the top choices. The entries(either all entries or some of them) in the top choice groups are then re-scored using more precise likelihoods. Then the top entries in the two top groups are extracted and processed by the rejection algorithm. Since the confusable orthographies are now grouped together, the likelihood of two confusable orthographies self colliding against one another is significantly reduced.

As embodied and broadly described herein, the invention provides a computer readable medium containing a speech recognition dictionary for use in a speech recognition system that includes a speech recognition layer and a rejection layer, said speech recognition dictionary including a plurality of orthography groups, each orthography group including a plurality of individual orthographies, at least one of said groups including a pair of confusable orthographies where in the event said pair of confusable orthographies are processed by the rejection layer a high probability exists that the rejection layer will reject a selected one of said pair of confusable orthographies by the speech recognition layer. This probability may be of say 0.8. This value is not critical, however as a higher or lower probability of rejection may exist without departing from the spirit of the invention.

In a preferred embodiment, confusable orthographies in the speech recognition dictionary are found by examining the results after running recognition on a large training set containing say 50,000 orthographies. For each orthography data is collected indicative of the entity with whom this orthography was confused or likely to be confused. The collected data also indicates the number of times each orthography was correctly recognized and the number of errors. Based on this information the entries in the speech recognition dictionary are re-grouped to associate the orthographies considered confusable.

As embodied and broadly described herein the invention further provides a computer readable medium containing a speech recognition dictionary for locality recognition for use in an automated directory assistance system that includes a speech recognition layer and a rejection layer, said speech recognition dictionary including a plurality of orthography groups, each orthography group including a plurality of individual orthographies, at least one of said groups including a pair of confusable orthographies where in the event said pair of confusable orthographies are processed by the rejection layer a high probability exists that the rejection layer will reject a selected one of said pair of confusable orthographies by the speech recognition layer, every orthography in at least one group of said speech recognition dictionary other than said one group being indicative of a substantially identical geographical area.

As embodied and broadly described herein the invention further provides a speech recognition system, comprising:
  a speech recognition layer
  a rejection layer;
  a speech recognition dictionary including a plurality of orthography groups, each orthography group including a plurality of individual orthographies potentially recognizable by said speech recognition layer on a basis of a spoken utterance by a user of said speech recognition system, at least one of said groups including a pair of confusable orthographies where in the event said pair of confusable orthographies are processed by said rejection layer a high probability exists that said rejection layer will reject a selected one of said pair of confusable orthographies by the speech recognition layer.

As embodied and broadly described herein, the invention also provides a process for reducing a likelihood of false rejection in a speech recognition system that includes:
  a speech recognition layer
  a rejection layer;
  a speech recognition dictionary including a plurality of individual orthographies potentially recognizable by said speech recognition layer on a basis of a spoken utterance by a user of the speech recognition system;
  said process comprising the step of:
    identifying at least one pair of orthographies in the speech recognition dictionary that are confusable beyond a certain threshold; and
    associating said pair of orthographies to provide means for substantially reducing a likelihood of the rejection layer processing together the orthographies of said pair.

As embodied and broadly described herein, the invention also provides an apparatus for re-arranging a speech recognition dictionary for use in a speech recognition system that includes a speech recognition layer and a rejection layer, the speech recognition dictionary including a plurality of orthographies potentially recognizable by the speech recognition layer on a basis of a spoken utterance by a user of the speech recognition system, said apparatus comprising:
  first memory means for holding orthographies of the speech recognition dictionary;
  a processor in operative relationship with said first memory means;
  a program element providing means for:
    identifying at least one pair of orthographies in the speech recognition dictionary that are confusable beyond a certain threshold; and
    associating said pair of orthographies to provide means for substantially reducing a likelihood of the rejection layer processing together the orthographies of said pair.

As embodied and broadly described herein, the invention further provides a machine readable medium containing a program element for instructing a computer for generating a speech recognition dictionary for use in a speech recognition system that includes a speech recognition layer and a rejection layer, the speech recognition dictionary including a plurality of orthographies, said computer including:
  first memory means for holding orthographies of the speech recognition dictionary;
  a processor in operative relationship with said first memory means;
  said program element providing means for:
    identifying at least one pair of orthographies in the speech recognition dictionary that are confusable, where in the event said pair of orthographies are processed by said rejection layer a high probability exists that said rejection layer will reject a selected one of said pair of confusable orthographies by the speech recognition layer;
    placing said pair of orthographies in a group of said speech recognition dictionary to provide means for substantially reducing a likelihood of the rejection layer processing together the orthographies of said pair.

DETAILED DESCRIPTION OF THE INVENTION

As an introductory comment it should be pointed out that the invention does not directly relate to the structure and operation of an automated directory assistance system, nor to the process for building the speech recognition dictionary from raw data, such as the white pages supplied by the telephone company. Rather, the invention is concerned with a method and apparatus for reorganizing a speech recognition dictionary that can be used in an automated directory assistance system to reduce false rejection. For more information on the structure and detailed operation of an automated directory assistance system the reader may refer to the following documents whose contents are hereby incorporated by reference.

U.S. PAT. NOS.

| U.S. Pat. No. | Inventor |
| --- | --- |
| 5,488,652 | Gregory, J. Bielby et al. |
| 4,164,025 | Dubnowski et al. |
| 4,751,737 | Gerson et al. |
| 4,797,910 | Daudelin |
| 4,959,855 | Daudelin |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,695 | Green |
| 5,515,475 | Gupta et al. |
| 5,307,444 | Tsuboka |
| 4,751,736 | Gupta et al. |
| 5,226,044 | Gupta et al. |
| 4,956,865 | Lenning et al. |
| 5,390,278 | Gupta et al. |
| 5,086,479 | Takenaga et al. |

PRIOR ART

| TITLE | AUTHOR | SOURCE |
| --- | --- | --- |
| Dynamic Adaptation of Hidden Markov Model for Robust Speech Recognition | | 1989, IEEE International Symposium on Circuits and Systems, vol. 2, May 1989 pp. 1336–1339 |
| Dynamic Modification of the Vocabulary of a Speech Recognition Machine | | IBM Technical Disclosure Bulletin, vol. 27, No. 7A, Dec. 1984 |
| Adaptive Acquisition of Language, | Gorin et al. | Computer Speech and Language, vol. 5, No. 2 Apr. 1991, London, GB, pp. 101–132 |
| Automated Bilingual Directory Assistance Trial In Bell Canada | Lenning et al, | IEEE Workshop on Interactive Voice Technology for Telecom Applications, Piscataway, NJ. Oct. 1992. |
| Unleashing The Potential of Human-To-Machine Communication | Labov and Lennig, | Telesis, Issue 97, 1993, pp. 23–27 |
| An introduction To Hidden Markov Models | Rabiner and Juang | IEEE ASSP Magazine, Jan. 1986, pp. 4–16 |
| Putting Speech Recognition to Work in The Telephone Network | Lennig, | Computer, published by IEEE Computer Society, vol. 23, No. 8, Aug. 1990 |
| Flexible Vocabulary Recognition of Speech Over The Telephone | Lennig et al. | IEEE Workshop on Interactive Voice Technology for Telecom Applications, Piscataway, NJ, Oct. 1992 |
| Large Vocabulary Continuous Speech Recognition: a Review | Steven Young | IEEE Automatic Speech Recognition Workshop, September 16, 1995 |

Figure 1:
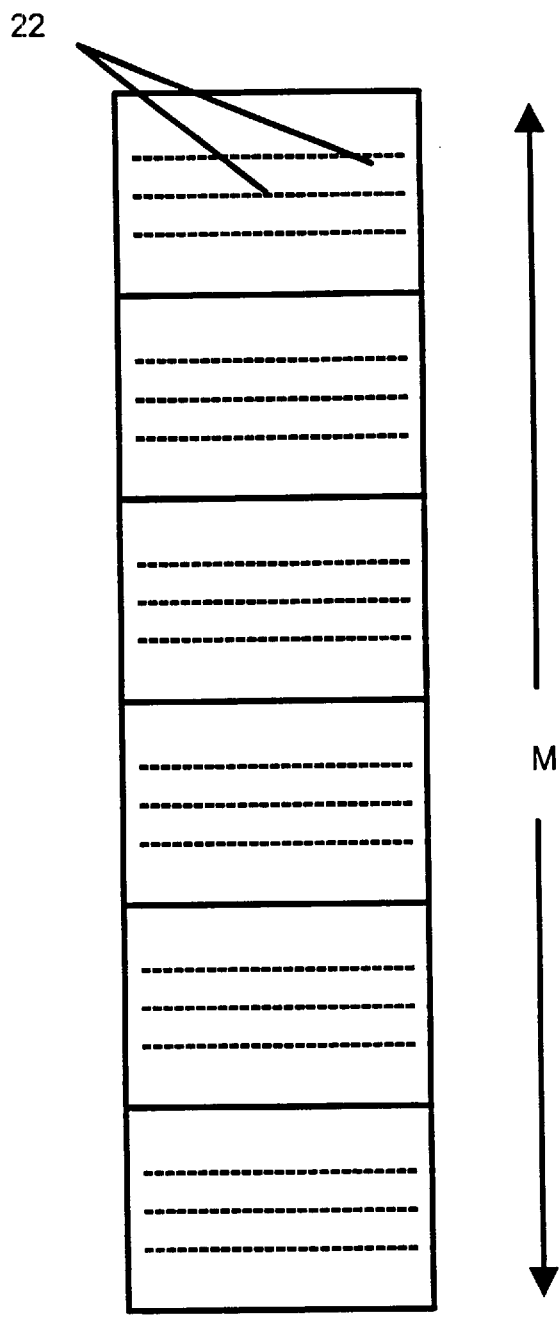
FIG. 1 is a block diagram illustrating the structure of a prior art speech recognition dictionary.

FIG. 1 illustrates the structure of a speech recognition dictionary constructed in accordance with prior art techniques. The dictionary is composed of a plurality of M groups, each group containing entries (orthographies) 22 that lead to the same action. In a specific example, a speech recognition dictionary relating to a localities listing will contain groups in which the orthographies corresponding to a given locality are associated together. For example the orthography "Laval" and "Ville de Laval" will be placed in a first group while the orthography "Lassalle" and "Ville de Lassalle" will be associated in a second group. The orthographies in each group relate to the same distinct geographic region. In general <<same action>> means that the orthographies in a given group are functional synonyms, in other words the action resulting from the selection of one orthography in a group is generally similar to what would result it another orthography in that same group would be selected. This definition, however, is applicable only to the preferred embodiment described herein, as other forms of groupings in the speech recognition dictionary are possible without departing from the spirit of the invention.

Figure 2:
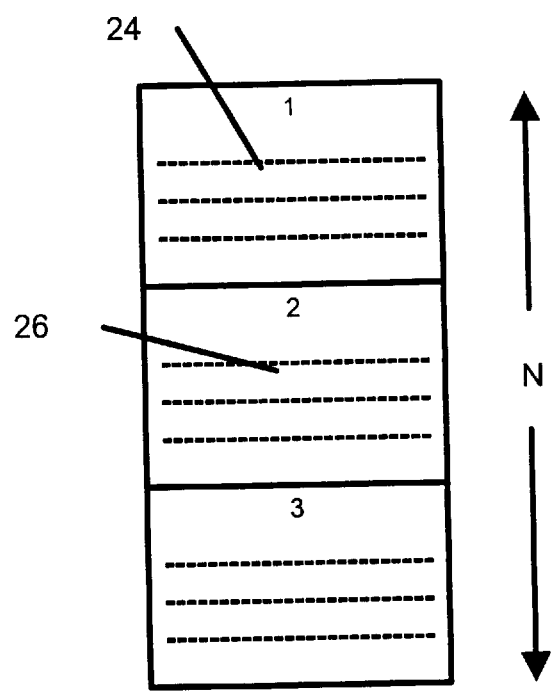
FIG. 2 is a block diagram of the selected orthography groups of a speech recognition dictionary after a first pass search by the speech recognition layer.

During the speech recognition process a first pass search is effected by using a fast match algorithm that scans all the orthographies in the speech recognition dictionary and selects the top N groups that contain the orthographies considered the most likely candidates. FIG. 2 graphically illustrates the selected N groups, here N being 3. The groups are ordered in terms of score, in other words the likelihood of containing the correct choice. In the example shown the entries of group 1 are considered the most likely candidates, followed by the entries in group two and finally the orthographies in group 3.

During the next phase of the speech recognition process, the orthographies in each group are re-scored by using more precise likelihoods. In this manner, the orthographies are re-arranged in the individual groups, with the top orthography in each group being the most likely candidate for that group. In a specific example all the orthographies in the group may be re-scored. In a possible variant only a subgroup of orthographies may be re-scored.

The rejection process consists of extracting from the two top groups, namely groups 1 and 2 the top choice orthographies 24 and 26. The top choice orthography 24 is the one that possesses the highest score. Thus, it is the entry that is most likely to correspond to the spoken utterance. However, before it is accepted by the system as a valid token, it is compared with the second rank orthography 26 to determine if they are sufficiently distinct from one another. Indeed, if the top choice orthography 24 is very close to the second rank orthography 26 the system will assume that a correct resolution between these two entries cannot be made with a high probability of success.

Figure 3:
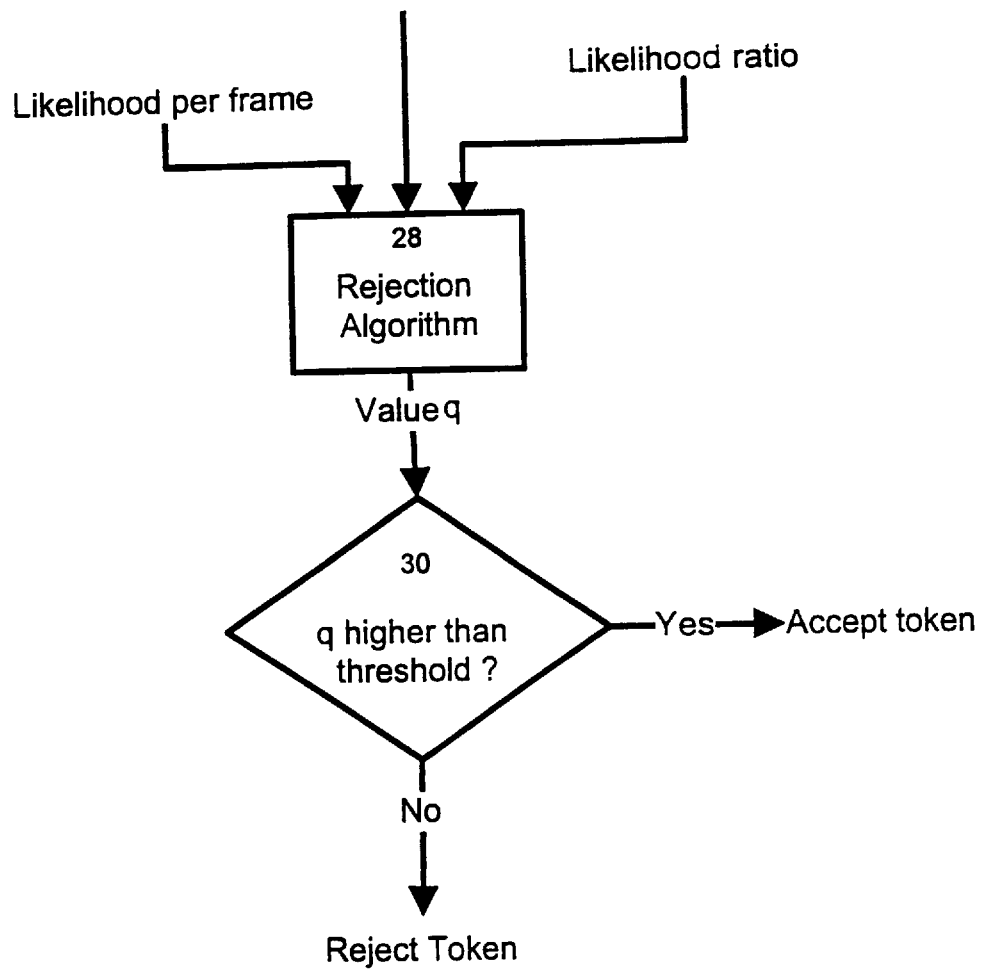
FIG. 3 is a flow chart of the rejection process.

In general, three parameters can be used to establish whether the two orthographies are of confusable nature. The three parameters are: the likelihood per frame of the top choice candidate, the duration likelihood of the phonemes in this top choice, and the likelihoods ratio of the two top choices. The last measure requires the top two choices to be phonetically far apart. FIG. 3 illustrates the flowchart for assessing the rejection ratio. At step 28 the rejection value $\theta$ is computed for the pair of orthographies. If at step 30 $\theta$ is found to exceed a certain threshold, the system assumes that the top choice orthographies are sufficiently apart so a correct resolution can be made with a high probability of success. Below the threshold, however, the operation is terminated and the system defaults to the human operator. The rejection algorithm is not described in detail because it does not form part of the invention. For more information, the reader is invited to refer to U.S. Pat. No. 5,097,509 whose contents are incorporated herein by reference.

To avoid the false rejection problem described earlier, the speech recognition dictionary can be re-organized to group together confusable orthographies. In this manner, the rejection process will process only substantially non-confusable entries, thus avoiding the self-collision problem.

Figure 4:
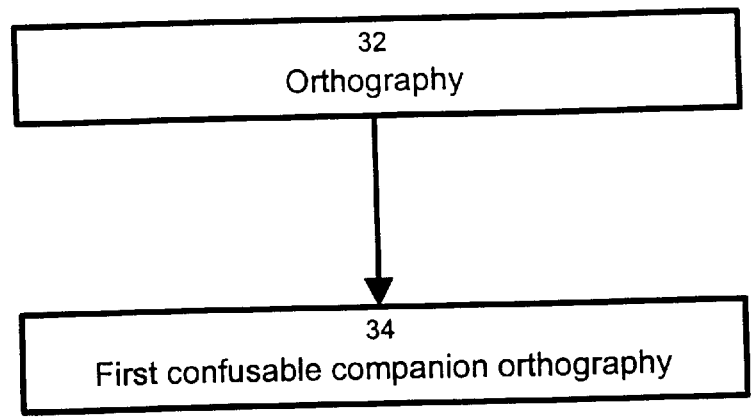
FIG. 4 is a block diagram illustrating the association of confusable orthographies.
Figure 5:
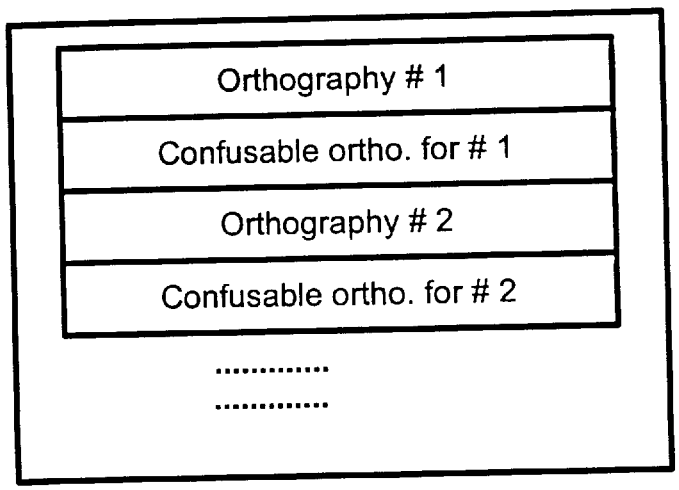
FIG. 5 is a block diagram illustrating a group of the speech recognition dictionary arranged in accordance with the inventive process with a view to reduce false rejection.
Figure 6:
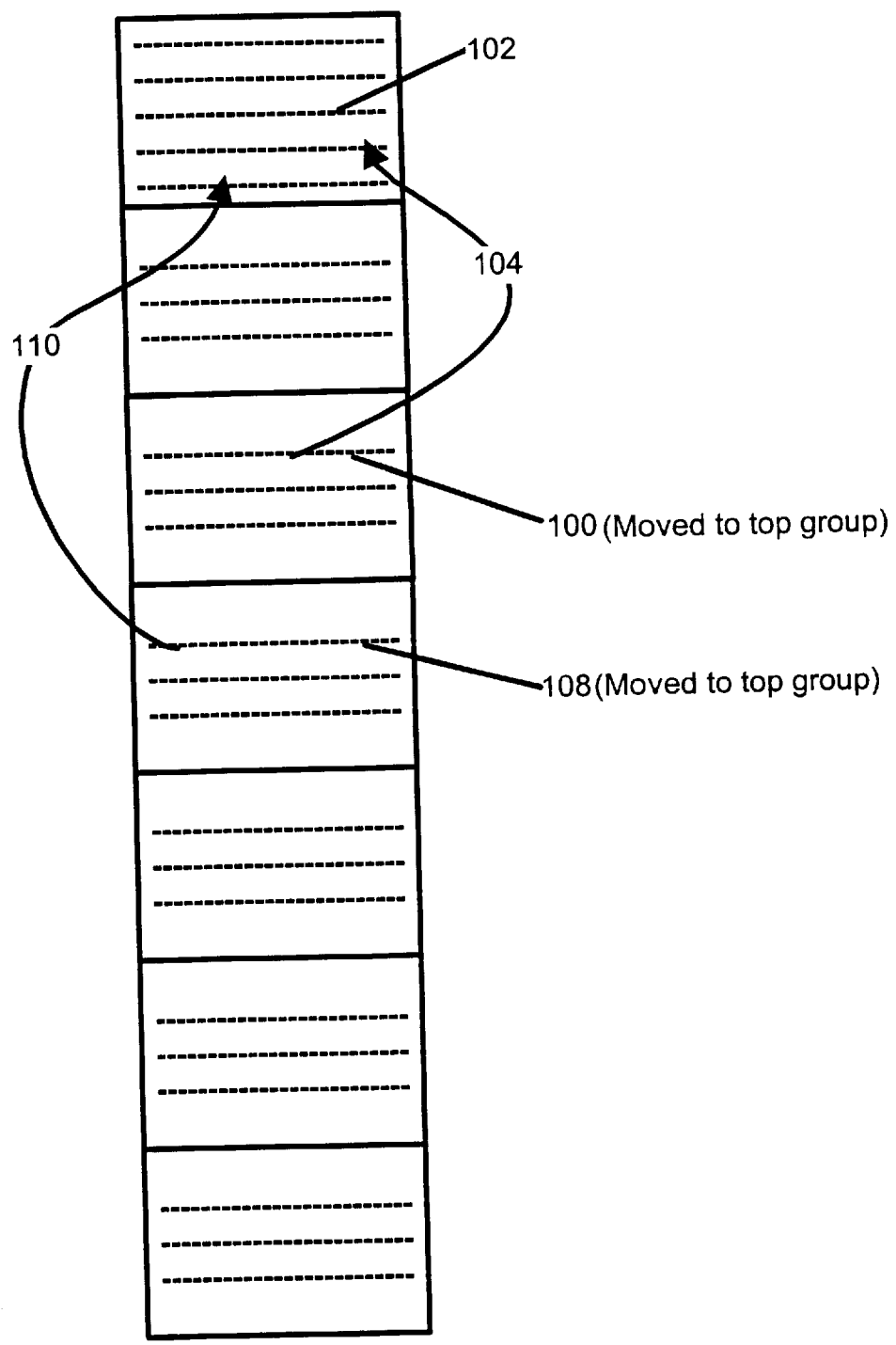
FIG. 6 is a block diagram of the speech recognition dictionary re-arranged to group confusable orthographies together.

FIG. 4 illustrates an orthography 32 of the speech recognition dictionary. This orthography is associated with another orthography 34 considered confusable with it. The confusable orthographies are grouped together in the speech recognition dictionary as shown in FIG. 5. This drawing illustrates the structure of the group of the re-arranged speech recognition dictionary containing the confusable orthographies. Assuming that the original group contained two orthographies (orthography #1 and orthography #2), the new group will contain four entries due to the association of each original orthography with one confusable orthography. It should be appreciated that the original orthography grouping was done based on action parallelism, i.e., the group contained orthographies leading to the same activity. The re-arranged group has no longer this characteristic as entries have been introduced that no longer lead to the same action. Another observation is the fact that by associating one orthography with a confusable companion may very well introduce in the group other orthographies as well. This is because the confusable companion may itself possess its own confusable companion that will be drawn in the group. This chaining may actually insert in the group a significant number of orthographies. FIG. 6 illustrates this point. The orthography 100 located in the second group is found to be confusable with the orthography 102 of the first group. As a result, the orthography 100 is moved to the second group. This action is shown by the arrow 104. However, the orthography 100 also possesses a companion confusable orthography 108 and that orthography is also moved to the top group. This action is shown by the arrow 110.

Another possibility is simply to create a new group in the speech recognition dictionary that contains the confusable orthographies, rather than placing the confusable entries in an existing group.

During the second pass search of the speech recognition process, the entries in the group are re-scored, each orthography being treated as an independent entity. The top choice is then extracted to be processed by the rejection layer along with the top choice from another group. In this example, however, since a single orthography is taken from each group, the self-collision problem between two confusable entries is substantially reduced.

To establish in a given speech recognition dictionary what are the mutually confusable entries, the following data is collected from screened tokens during the commissioning phase of the system (data elements collected for each screened token):

1) confusable orthography;
2) number of times recognized correctly with $\theta<\theta_i$
3) number of errors The value $\theta$ is the output of the rejection alorithm for the two choices, while $\theta_i$ is a certain threshold that establishes a boundary above which the screened token will simply be ignored. This feature is used to reduce the number of tokens to be processed in the course of searching for confusable orthographies. Only those tokens that are below a given threshold will be inspected by the system while those above the threshold are passed by. The particular threshold value can vary in accordance with the intended application and it is not a critical element of the invention.

To illustrate this algorithm, the following examples can be considered:

a) spoken utterance: Saint-Eustache
b) top choice generated by system: Sainte-Marthe
c) second choice generated by system: Sainte-Barbe
d) is the rejection value for the two choices In this example the potentially confusable orthography is Sainte-Marthe. Since this is a misrecognition the error count associated with the orthographies Saint-Eustache and Sainte-Marthe is increased by one. In the situation the spoken utterance is correctly recognized, the second choice generated by the system becomes the potentially confusable orthography and the count for correct recognition with $\theta<\theta_i$ is incremented. Additional examples are illustrated in the following tables.

| SPOKEN UTTERANCE | TOP CHOICE | SECOND CHOICE |
| --- | --- | --- |
| Saint-Eustache | Sainte-Marthe | Sainte-Barbe |
| Saint-Eustache | Saint-Eustache | Sainte-Barbe |
| Saint-Eustache | Sainte-Barbe | Sainte-Marthe |
| Laval | Laval | Lassalle |
| Laval | Lassalle | Laville |
| Laval | Laville | Lassalle |

The results show that after three recognition attempts for the orthography <<Saint-Eustache>> two potentially confusable orthographies exist, namely <<Sainte-Barbe>> and <<Sainte-Marthe>>. More specifically, at the first row <<Saint-Eustache>> and <<Sainte-Marthe>> are the potentially confusable pair, with the error count associated with that pair being incremented by one. At row two, the potentially confusable pair is <<Saint-Eustache>> and <<Sainte-Barbe>>, the correct count for that pair being incremented by one. At the third row, <<Saint-Eustache>> and <<Sainte-Barbe>> are the potentially confusable entries, with the error count for the pair being incremented by one. At the fourth row, <<Laval>> and <<Lassalle>> are the potentially confusable entries, with the correct count being incremented by one. At the fifth row, <<Laval>> and <<Lassalle>> are the potentially confusable pair, with the error count for the pair increased by one. Finally, at the sixth row, <<Laval>> and <<Laville>> are considered as potentially confusable entries with the error count increased by one. The results from these six tokens can be summarized in the following table:

| POTENTIALLY CONFUSABLE PAIR | ERROR COUNT | CORRECT COUNT |
|---|---|---|
| Saint-Eustache/Sainte-Marthe | 1 | 0 |
| Saint-Eustache/Sainte-Barbe | 1 | 1 |
| Laval/Lassalle | 1 | 1 |
| Laval/Laville | 1 | 0 |

Another possibility of determining the potentially confusable orthographies in the dictionary is to look only at the top choice and at the second choice. Every time the recognition is correct with $\theta<\theta_i$ the correct count is incremented by one. Every time the top choice is incorrect with $\theta<\theta_i$ the error count for the word pair is incremented. For example, in the first row of the above table, <<Sainte-Marthe>> is potentially confusable with <<Sainte-Barbe>> and the error count is incremented by one since it is a misrecognition. For the second row, <<Sainte-Eustache>> and <<Sainte-Barbe>> are the potentially confusable words, the correct count being incremented by one. In the third row, <<Sainte-Barbe>> and <<Sainte-Marthe>> are the potentially confusable pair, with the error count for that pair being incremented by one. At the fourth row, the potentially confusable entries are <<Laval>> and <<Lassalle>>, with the correct count being incremented by one. At the fifth row, <<Lassalle>> and <<Laville>> are potentially confusable with the error count being incremented by one. Finally, at the sixth row, <<Laville>> and <<Lassalle>> are the potentially confusable orthographies with the error count being incremented by one.

The expression <<potentially confusable>> orthography refers to an entry in the speech recognition dictionary that may be confused with a given orthography. Actually, for each orthography in the speech recognition dictionary there may exist a number of potentially confusable entries that can be identified by either one of the above methods. In practice, not all of those potentially confusable entries need to be grouped together in the dictionary to achieve a significant reduction in false rejection. In practice only a few of the potentially confusable entries will be associated together and those entries are referred to as <<confusable>> orthographies, rather than <<potentially confusable>> orthographies. Thus, in the vast majority of cases, the confusable orthographies are a sub-class of the potentially confusable entries.

Several methods exist for extracting the sub-class of confusable orthographies from the class of potentially confusable entries. One method is by observing the correct recognition count and error count and comparing it to a threshold. For example, if a potentially confusable pair, say <<Saint-Eustache>> and <<Sainte-Marthe>> has a correct count greater than 10, an error count greater than 1 and a total count (correct count+error count) greater than 25, then these two entries acquire the <<confusable>> status. Another possible method is to say that two words are confusable when the ratio of correct count/error count is greater a 0.5 and the total count greater than 10. It should be appreciated that all those thresholds can vary without departing from the spirit of the invention.

Once the confusable orthography pairs have been generated they must be implanted in the speech recognition dictionary. Two different methods exist for accomplishing this. In one method for each orthography in a given group only a single orthography is entered in that group. Thus, if the group has A orthographies after the re-arranging process is completed it will possess at maximum 2A orthographies. In a different approach larger groups are formed by entering in a group a chain of confusable orthographies as discussed earlier in connection with FIG. 6. This possibility has the advantage of further reducing false rejection as larger number of confusable entries are held in the same group.

Figure 7:
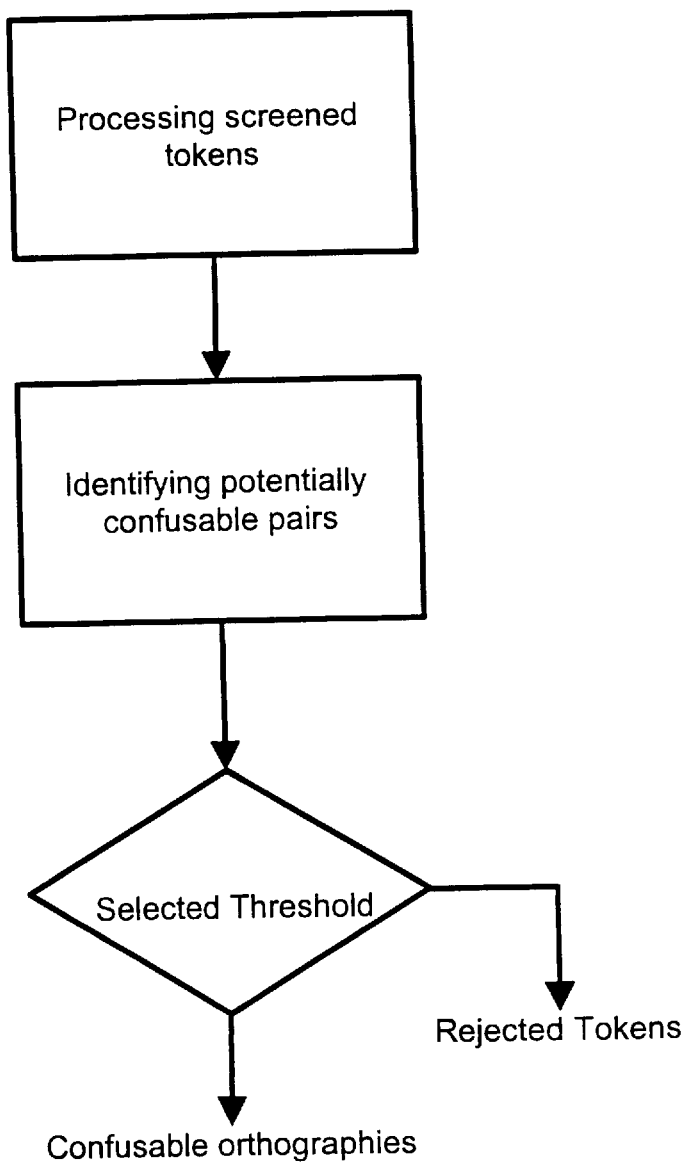
FIG. 7 is flow chart of the selection of confusable orthographies in the speech recognition dictionary.
Figure 8:
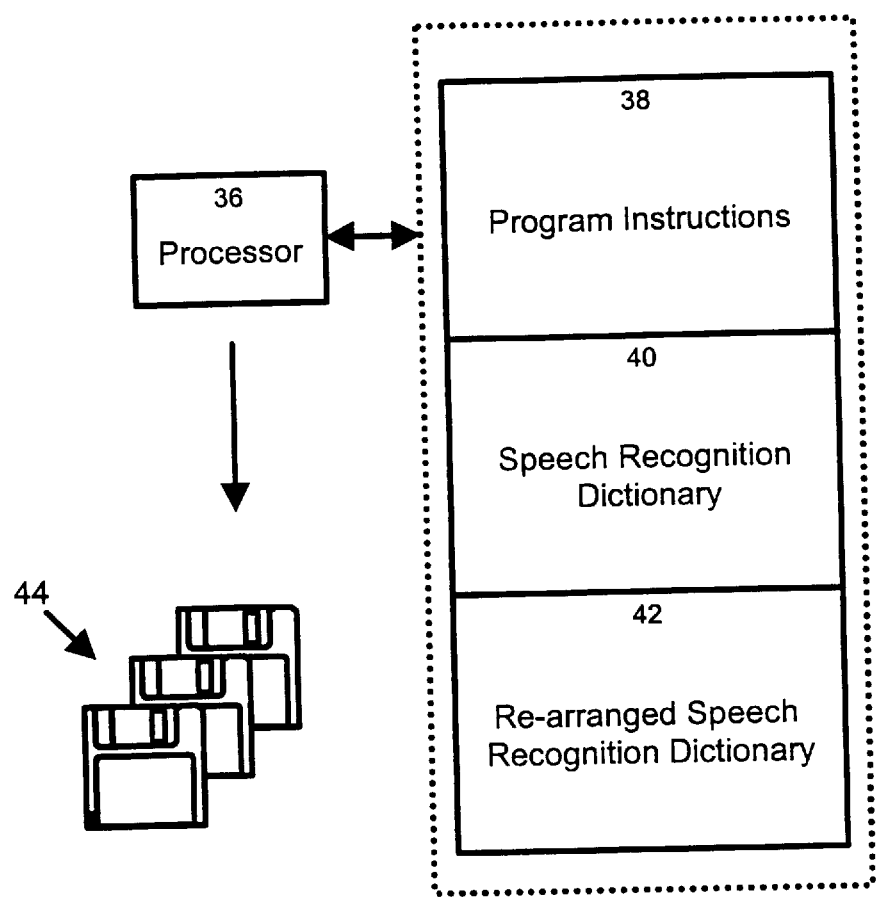
FIG. 8 is a functional block diagram of an apparatus for generating the re-arranged speech recognition dictionary allowing to reduce false rejection.

The process for generating the re-arranged speech recognition dictionary is shown at FIGS. 7 and 8. After the step that consists of identifying the potentially confusable orthographies, the confusable ones are determined by comparing each potentially confusable pair to a threshold value. Once the confusable orthographies have been identified, they are displaced and grouped together according to either one of the two possibilities described earlier. The entire operation is effected by using the computer illustrated at FIG. 8. The computer includes a processor 36 in operative relationship with a memory having three segments, namely a first segment 38 containing program instructions, a second segment 40 containing the speech recognition dictionary, and a third segment 42 containing the re-arranged speech recognition dictionary. Under the instructions from the program in the first memory segment 38, the processor 36 identifies the confusable orthography pairs and re-arranges them. The resulting entries are then placed in the third memory segment 42. The rearranged speech recognition dictionary may then be recorded on mass storage 44, if wanted.

The above description of a preferred embodiment should not be interpreted in any limiting manner since variations and refinements can be made without departing from the spirit of the invention. The scope of the invention is defined in the appended claims and their equivalents.

We claim:

1. A computer readable medium containing a speech recognition dictionary for use in a speech recognition system that includes a speech recognition layer and a rejection layer, said speech recognition dictionary including a plurality of orthography groups, each orthography group including a plurality of individual orthographies, at least one of said groups including a pair of confusable orthographies where in the event said pair of confusable orthographies are processed by the rejection layer a high probability exists that the rejection layer will reject a selected one of said pair of confusable orthographies by the speech recognition layer.

2. A computer readable medium as defined in claim 1, wherein said pair of confusable orthographies have the highest likelihood of being rejected by the rejection layer by comparison to any other pair of orthographies in said speech recognition dictionary.

3. A computer readable medium as defined in claim 1, wherein the probability that the rejection layer rejects said pair of orthographies is of at least about 0.8.

4. A computer readable medium as defined in claim 1, wherein said one group includes a plurality of pairs of confusable orthographies.

5. A computer readable medium as defined in claim 1, for use in an automated directory assistance system, wherein said speech recognition dictionary includes a plurality of orthography groups other than said one group, each one of said plurality of groups other than said one group containing orthographies, each orthography in a group selected from said plurality of groups other than said one group pointing toward a substantially identical element that at least partially allows to ascertain identity of a party whose telephone number is sought by a user of the automated directory assistance system.

6. A computer readable medium as defined in claim 5, wherein said element is a geographical area.

7. A computer readable medium containing a speech recognition dictionary for locality recognition for use in an automated directory assistance system that includes a speech recognition layer and a rejection layer, said speech recognition dictionary including a plurality of orthography groups, each orthography group including a plurality of individual orthographies, at least one of said groups including a pair of confusable orthographies where in the event said pair of confusable orthographies are processed by the rejection layer a high probability exists that the rejection layer will reject a selected one of said pair of confusable orthographies by the speech recognition layer, every orthography in at least one group of said speech recognition dictionary other than said one group being indicative of a substantially identical geographical area.

8. A computer readable medium containing a speech recognition dictionary as defined in claim 7, wherein said pair of confusable orthographies have the highest likelihood of being rejected by the rejection layer by comparison to any other pair of orthographies in said speech recognition dictionary.

9. A speech recognition system, comprising:
a speech recognition layer
a rejection layer;
a speech recognition dictionary including a plurality of orthography groups, each orthography group including a plurality of individual orthographies potentially recognizable by said speech recognition layer on a basis of a spoken utterance by a user of said speech recognition system, at least one of said groups including a pair of confusable orthographies where in the event said pair of confusable orthographies are processed by said rejection layer a high probability exists that said rejection layer will reject a selected one of said pair of confusable orthographies by the speech recognition layer.

10. A speech recognition system as defined in claim 9, wherein said pair of confusable orthographies have the highest likelihood of being rejected by the rejection layer by comparison to any other pair of orthographies in said speech recognition dictionary.

11. A speech recognition system as defined in claim 10, wherein said one group includes a plurality of pairs of confusable orthographies.

12. A speech recognition system as defined in claim 10, wherein said dictionary includes a plurality of orthography groups other than said one group, each one of said plurality of groups other than said one group containing orthographies, each orthography in a group selected from said plurality of groups other than said one group pointing toward a substantially identical element that at least partially allows to ascertain identity of a party whose telephone number is sought by a user of the automated directory assistance system.

13. A speech recognition system as defined in claim 12, wherein said element is a geographical area.

14. A speech recognition system as defined in claim 10, wherein the probability that the rejection layer will reject a selected one of said pair of confusable orthographies by the speech recognition layer is of at least about 0.8.

15. A speech recognition system as defined in claim 1, wherein said speech recognition dictionary is used in an automated directory assistance system.

16. A process for reducing a likelihood of false rejection in a speech recognition system that includes:
a speech recognition layer
a rejection layer;
a speech recognition dictionary including a plurality of individual orthographies potentially recognizable by said speech recognition layer on a basis of a spoken utterance by a user of the speech recognition system;
said process comprising the step of:
identifying at least one pair of orthographies in the speech recognition dictionary that are confusable beyond a certain threshold; and
associating said pair of orthographies to provide means for substantially reducing a likelihood of the rejection layer processing together the orthographies of said pair.

17. A process for reducing a likelihood of false rejection as defined in claim 16, wherein said speech recognition dictionary includes a plurality of groups, each group containing individual orthographies, said process comprising the step of placing said pair of orthographies in the same group.

18. A process for reducing a likelihood of false rejection as defined in claim 17, comprising the step of identifying two orthographies in said speech recognition dictionary have the highest likelihood of being rejected by the rejection layer by comparison to any other pair of orthographies in said speech recognition dictionary, and selecting said two orthographies as said pair of orthographies in the speech recognition dictionary that are confusable beyond a certain threshold.

19. A process as defined in claim 17, comprising the step of displacing at least one orthography of said pair of orthographies to locate said pair of orthographies in the same group of said speech recognition dictionary.

20. A process as defined in claim 16, comprising the steps of identifying a plurality of confusable orthography pairs in said speech recognition dictionary and placing all confusable orthography pairs so identified in at least one group.

21. A process as defined in claim 16, wherein the step of identifying at least one pair of orthographies in the speech recognition dictionary that are confusable beyond a certain threshold includes the step of observing data indicative of a count of a number of times one orthography of said pair has been correctly recognized when the other orthography of said pair has been selected as second choice by the speech recognition layer.

22. A process as defined in claim 16, wherein the step of identifying at least one pair of orthographies in the speech recognition dictionary that are confusable beyond a certain threshold includes the step of observing data indicative of a count of a number of times one orthography of said pair has been misrecognized when the other orthography of said pair has been selected as first choice by the speech recognition layer.

23. A process as defined in claim 16, wherein the step of identifying at least one pair of orthographies in the speech recognition dictionary includes the step of observing data indicative of a count of a number of times one orthography of said pair has been recognized correctly when said one orthography has been output as top choice by the speech recognition layer and the other orthography of said pair of orthographies is output as second choice by the speech recognition layer.

24. A process as defined in claim 16, wherein the step of identifying at least one pair of orthographies in the speech recognition dictionary includes the step of observing data indicative of a count of a number of times one orthography of said pair has been misrecognized when said one orthography has been output as top choice by the speech recognition layer and the other orthography of said pair of orthographies is output as second choice by the speech recognition layer.

25. An apparatus for re-arranging a speech recognition dictionary for use in a speech recognition system that includes a speech recognition layer and a rejection layer, the speech recognition dictionary including a plurality of orthographies potentially recognizable by the speech recognition layer on a basis of a spoken utterance by a user of the speech recognition system, said apparatus comprising:
first memory means for holding orthographies of the speech recognition dictionary;
a processor in operative relationship with said first memory means;
a program element providing means for:
identifying at least one pair of orthographies in the speech recognition dictionary that are confusable beyond a certain threshold; and
associating said pair of orthographies to provide means for substantially reducing a likelihood of the rejection layer processing together the orthographies of said pair.

26. An apparatus as defined in claim 25, wherein said apparatus comprises a second memory means for storing the re-arranged speech recognition dictionary that includes said pair of orthographies that are confusable beyond a certain threshold in a condition of association.

27. An apparatus as defined in claim 26, comprising means for transferring said re-arranged speech recognition dictionary from said second memory means to mass storage.

28. An apparatus as defined in claim 25, wherein said speech recognition dictionary includes a plurality of groups, each group containing individual orthographies, said program element providing means for placing said pair of orthographies in the same group.

29. An apparatus as defined in claim 25, wherein said program element provides means for identifying two orthographies in said speech recognition dictionary that have the highest likelihood of being rejected by the rejection layer by comparison to any other pair of orthographies in said speech recognition dictionary, and selecting said two orthographies as said pair of orthographies in the speech recognition dictionary that are confusable beyond a certain threshold.

30. An apparatus as defined in claim 28, wherein said program element provides means for directing said apparatus for displacing at least one orthography of said pair of orthographies to locate said pair of orthographies in the same group of said speech recognition dictionary.

31. An apparatus as defined in claim 28, wherein said program element provides means for identifying a plurality of confusable orthography pairs in said speech recognition dictionary and directing said apparatus to place all confusable orthography pairs so identified in at least one group.

32. An apparatus as defined in claim 25, wherein said program element providing means for identifying at least one pair of orthographies in the speech recognition dictionary that are confusable beyond a certain threshold includes means for directing said apparatus to process data indicative of a count of a number of times one orthography of said pair has been correctly recognized when the other orthography of said pair has been selected as second choice by the speech recognition layer.

33. An apparatus as defined in claim 25, wherein said program element providing means for identifying at least one pair of orthographies in the speech recognition dictionary that are confusable beyond a certain threshold includes means for directing said apparatus to process data indicative of a count of a number of times one orthography of said pair has been misrecognized when the other orthography of said pair has been selected as first choice by the speech recognition layer.

34. An apparatus as defined in claim 25, wherein said program element providing means for identifying at least one pair of orthographies in the speech recognition dictionary includes means for directing said apparatus to process data indicative of a count of a number of times one orthography of said pair has been recognized correctly when said one orthography has been output as top choice by the speech recognition layer and the other orthography of said pair of orthographies is output as second choice by the speech recognition layer.

35. An apparatus as defined in claim 25, wherein said program element providing means for identifying at least one pair of orthographies in the speech recognition dictionary includes means for directing said apparatus to process data indicative of a count of a number of times one orthography of said pair has been misrecognized when said one orthography has been output as top choice by the speech recognition layer and the other orthography of said pair of orthographies is output as second choice by the speech recognition layer.

36. A machine readable medium containing a program element for instructing a computer for generating a speech recognition dictionary for use in a speech recognition system that includes a speech recognition layer and a rejection layer, the speech recognition dictionary including a plurality of orthographies, said computer including:
first memory means for holding orthographies of the speech recognition dictionary;
a processor in operative relationship with said first memory means;
said program element providing means for:
identifying at least one pair of orthographies in the speech recognition dictionary that are confusable, where in the event said pair of orthographies are processed by said rejection layer a high probability exists that said rejection layer will reject a selected one of said pair of confusable orthographies by the speech recognition layer;
placing said pair of orthographies in a group of said speech recognition dictionary to provide means for substantially reducing a likelihood of the rejection layer processing together the orthographies of said pair.

37. A machine readable medium as defined in claim 36, wherein said speech recognition dictionary includes a plurality of groups, each group containing individual orthographies, said program element providing means for placing said pair of orthographies in the same group.

38. A machine readable medium as defined in claim 36, wherein said program element provides means for identifying two orthographies in said speech recognition dictionary that have the highest likelihood of being rejected by the rejection layer by comparison to any other pair of orthographies in said speech recognition dictionary, and selecting said two orthographies as said pair of orthographies in the speech recognition dictionary that are confusable beyond a certain threshold.

39. A machine readable medium as defined in claim 37, wherein said program element provides means for directing said computer to displace at least one orthography of said pair of orthographies to locate said pair of orthographies in the same group of said speech recognition dictionary.

40. A machine readable medium as defined in claim 37, wherein said program element provides means for identifying a plurality of confusable orthography pairs in said speech recognition dictionary and directing said computer to place all confusable orthography pairs so identified in at least one group.

41. A machine readable medium as defined in claim 36, wherein said program element providing means for identifying at least one pair of orthographies in the speech recognition dictionary that are confusable beyond a certain threshold includes means for directing said computer to process data indicative of a count of a number of times one orthography of said pair has been correctly recognized when the other orthography of said pair has been selected as second choice by the speech recognition layer.

42. A machine readable medium as defined in claim 36, wherein said program element providing means for identifying at least one pair of orthographies in the speech recognition dictionary that are confusable beyond a certain threshold includes means for directing said computer to process data indicative of a count of a number of times one orthography of said pair has been misrecognized when the other orthography of said pair has been selected as first choice by the speech recognition layer.

43. A machine readable medium as defined in claim 36, wherein said program element providing means for identifying at least one pair of orthographies in the speech recognition dictionary includes means for directing said computer to process data indicative of a count of a number of times one orthography of said pair has been recognized correctly when said one orthography has been output as top choice by the speech recognition layer and the other orthography of said pair of orthographies is output as second choice by the speech recognition layer.

44. A machine readable medium as defined in claim 36, wherein said program element providing means for identifying at least one pair of orthographies in the speech recognition dictionary includes means for directing said computer to process data indicative of a count of a number of times one orthography of said pair has been misrecognized when said one orthography has been output as top choice by the speech recognition layer and the other orthography of said pair of orthographies is output as second choice by the speech recognition layer.

\* \* \* \* \*